United States Patent [19]

Schrenk et al.

[11] Patent Number: 4,937,134

[45] Date of Patent: Jun. 26, 1990

[54] ELASTOMERIC OPTICAL INTERFERENCE FILMS

[75] Inventors: Walter J. Schrenk, Midland; William E. Shrum, St. Louis; John A. Wheatley, Midland, all of Mich.

[73] Assignee: The Dow Chemical Company, Midland, Mich.

[21] Appl. No.: 339,267

[22] Filed: Apr. 17, 1989

[51] Int. Cl.$^5$ ............ G02B 27/00; B32B 27/36; B32B 27/40

[52] U.S. Cl. ............ 428/213; 428/212; 428/215; 428/423.3; 428/423.5; 428/423.7; 428/474.4; 428/475.2; 428/480; 350/163; 350/164

[58] Field of Search ............ 428/212, 213, 423.3, 428/423.5, 423.7, 474.4, 475.2, 480, 215; 350/163, 164

[56] References Cited

U.S. PATENT DOCUMENTS 3,711,176 1/1973 Alfrey, Jr. et al. ............ 350/1
4,310,584 1/1982 Cooper et al. ............ 428/212

OTHER PUBLICATIONS

Radford et al., "Reflectivity of Iridescent Coextruded Multilayered Plastic Films", *Polymer Engineering and Science*, May, 1973.

Kimura et al, "Tunable Multilayer-Film Distributed Bragg Reflector Filter", *J. Appl. Phys.*, vol. 50, No. 3, Mar. 1979.

B. Miller, "Technology Watch", *Plastics World*, Oct., 1988.

*Primary Examiner*—Marion C. McCamish
*Assistant Examiner*—Elizabeth M. Cole

[57] ABSTRACT

The present invention provides improved elastomeric interference films which are readily coextruded, have improved transparency, and have greater mismatches of refractive indices than those of the prior art. An improved elastomeric optical interference film comprising at least 100 alternating layers of at least first and second divergent substantially transparent elastomeric polymeric materials is provided. Adjacent layers of the first and second polymeric materials differ from each other in refractive index by at least about 0.05, and the thickness of the layers is from about 0.05 to about 0.5 micrometers. Stretching the films results in different wavelengths of light being reflected.

23 Claims, 3 Drawing Sheets

ELASTOMERIC OPTICAL INTERFERENCE FILMS

BACKGROUND OF THE INVENTION

The present invention relates to elastomeric films, and more particularly to elastomeric optical interference films in which the reflected wavelength of light impinging on the film changes as the film is reversibly deformed.

Coextruded multilayer films have been made which comprise multiple alternating layers of two polymers with individual layer thicknesses of 100 nanometers or less. Such multilayer films are described, for example, in Alfrey et al, U.S. Pat. No. 3,711,176. When polymers are selected to have a sufficient mismatch in refractive indices, these multilayer films cause constructive interference of light. This results in the film transmitting certain wavelengths of light through the film while reflecting other wavelengths.

The reflection and transmission spectra for a particular film are primarily dependent on the optical thickness of the individual layers, where optical thickness is defined as the product of the actual thickness of the layer times its refractive index. Films can be designed to reflect infrared, visible, or ultraviolet wavelengths of light depending on the optical thickness of the layers. The films produced in accordance with the above mentioned Alfrey patent exhibit iridescence and changing colors as the angle of incident light on the film is changed.

The Alfrey patent also describes an elastomeric film made up of many alternating layers of two polymers. As the film is stretched, the change in the thickness of the layers causes the film to reflect different wavelengths of light. As the film is relaxed, the layers return to their original thickness and reflect their original wavelengths.

A problem with the elastomers described by Alfrey was that they had only a small refractive index mismatch, which limited the optical interference effects which could be achieved. Additionally, such elastomers had less than ideal transparency, where not readily coextruded, and tended to contain gels due to partial cross-linking. Accordingly, there still exists a need in the art for improved elastomeric optical interference films which are not subject to the drawbacks of prior art films.

SUMMARY OF THE INVENTION

The present invention meets that need by providing improved elastomeric interference films which are readily coextruded, have improved transparency, and have greater mismatches of refractive indices than those of the prior art. In accordance with one aspect of the invention, an improved elastomeric optical interference film comprising at least 100 alternating layers of at least first and second divergent substantially transparent elastomeric polymeric materials, and preferably at least 200 alternating layers, is provided. The first and second polymeric materials comprise combinations of polytetramethylene glycol ether thermoplastic polyurethanes, polyadipate ester thermoplastic polyurethanes, polyether block amides, and flexible copolyesters. Adjacent layers of the first and second polymeric materials differ from each other in refractive index by at least about 0.05, and preferably at least about 0.06 or more. The thickness of the layers is from about 0.05 to about 0.5 micrometers, with thickness in the range of from about 0.05 to about 0.1 being preferred for irridescent films having first order reflections in the visible region of the spectrum.

The layers of the first and second polymeric materials may vary in thickness to provide a film which reflects a broad range of wavelengths of light. This may be accomplished by arranging the layers of either or both the first and second polymeric materials to generally increase in thickness through the film. Alternatively, other combinations of layer thickness gradients may be used.

The layers of the film may be varied in thickness by stretching to shift the reflected light from the film to shorter wavelengths. Relaxing the film permits the film layers to return to substantially their original thickness, and thus reflect their originally designed wavelengths.

The elastomeric optical interference film of the present invention may also optionally include a skin layer on one or both major surfaces of the film. The skin layer comprises a blend of a substantially transparent elastomeric polymeric material with a substantially transparent, nonelastomeric polymeric material having substantially the same index of refraction as the elastomeric polymer. Optionally, the elastomeric polymeric material in the skin layer may be one of the elastomers which makes up the alternating layer of the optical interference film. The nonelastomeric polymer is preferably present in the blend in an amount of between about 0.5 to about 10% by weight, and most preferably about 4.0 to about 6.0% by weight.

In a preferred embodiment of the invention, the skin layer comprises about 5% by weight polypropylene as the nonelastomeric component and about 95% by weight of a polyether block amide elastomer. The skin layer retains elastomeric characteristics and transparency while providing the film with a protective surface which is nonblocking. The skin layer also remains receptive to lamination of the film to other surfaces as well as receptive to inks or other forms of printing.

The transparent elastomeric optical interference films of the present invention have a number of uses. For example, the films may be used for packaging which displays changing color patterns, toy or novelty items which change colors when stretched, and signs or advertisements in which selective stretching of portions of the film causes a pulsating color change effect. The films may also find use as solar screens which reflect infrared light, or which can be stretched to transmit infrared and visible light but reflect ultraviolet light.

The elastomeric films of the present invention may also be used as adjustable light filters in photography or in agriculture. With respect to the latter use, a greenhouse film may be formed that varies the transmitted wavelengths of light desired or which maintains transmission of a desired wavelength of light as the angle of incidence of the light changes. The films of the present invention may also be used as pressure sensors to detect pressure changes and exhibit a color change in response thereto. The elastomeric films may also find use in erasable optical disc technology.

Accordingly, it is an object of the present invention to provide improved elastomeric interference films which are readily coextruded, have improved transparency, and have greater mismatches of refractive indices than those of the prior art. This, and other objects and advantages of the present invention, will become apparent from the following detailed description, the accompanying drawings, and the appended claims.

DETAILED DESCRIPTION OF THE PREFERRED EMBODIMENTS

Figure 1:
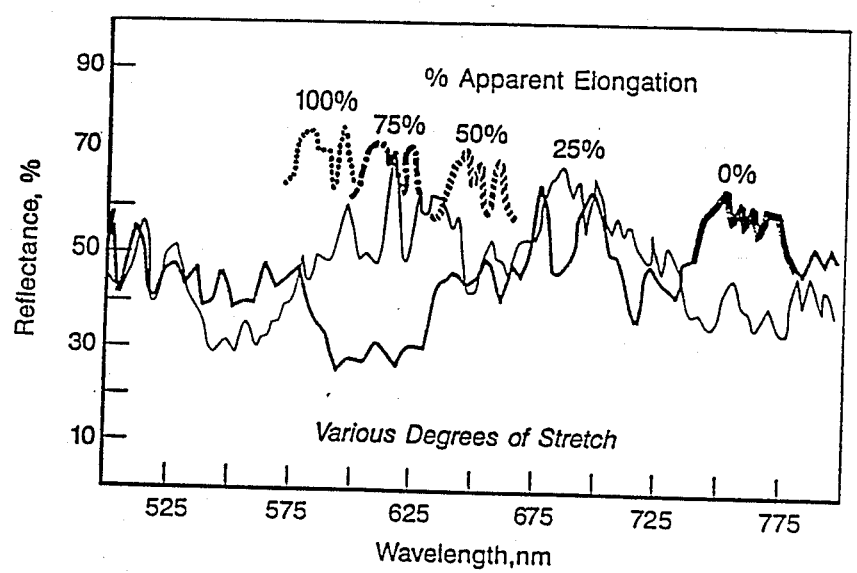
FIG. 1 is a graph of reflectance versus degree of stretch for a multilayer film of the present invention.

The present invention provides improved elastomeric optical interference films with a number of desirable properties. The optical theory of multiple reflections from layers having differing refractive indices demonstrates the dependency of the effect on both individual layer thickness as well as refractive index of the material. See, Radford et al, "Reflectivity of Iridescent Coextruded Multilayered Plastic Films", 13 Polymer Engineering and Science 216 (1973). The primary or first order reflected wavelength for a two component multilayer film is given by Equation 1 below.

$$\lambda_I = 2(N_1 D_1 + N_2 D_2) \qquad \text{(Eq. 1)}$$

where, $\lambda_I$ is the wavelength of first order reflection in nanometers, $N_1$ and $N_2$ are the refractive indices of the two polymers, and $D_1$ and $D_2$ are the layer thicknesses of the two polymers, also in nanometers. As can be seen, the first order reflected wavelength is proportional to the sum of the optical thicknesses of the two polymers (where optical thickness is the product of layer thickness times refractive index). In addition to first order reflections, higher order reflections occur at integer fractions of the first order. The relative intensity of these higher order reflections depends on the ratio of the optical thickness of the polymer components.

These optical interference principles are also applicable to elastomeric multilayer films. Thus, an unstretched film of an initial overall thickness $t_o$, and having many alternating layers of optical thickness $N_1 D_1$ and $N_2 D_2$, will reflect wavelength $\lambda_o$ at normal incidence. When the overall thickness of the film is reduced by stretching to $t'$, all of the individual layers thin proportionately to $d_1'$ and $d_2'$.

Assuming that the refractive indices of the polymers remain constant (i.e., zero stress optical coefficient), the peak reflecting wavelength $\lambda'$ decreases linearly with decreasing film thickness. The reflected wavelength returns to the original wavelength, $\lambda_o$, when the film is permitted to relax to its original thickness. Repetitive, reversible shifts in peak reflecting wavelength are made possible as long as no permanent set or deformation is introduced into the film.

The alternating layers of diverse polymers in the present invention provide a sufficiently large mismatch in refractive indices that the films have high reflectivity. A difference in refractive index between the polymers of at least about 0.05, and preferably at least about 0.06 or more, is needed to obtain films having a high degree of reflectance. Generally, the films of the present invention comprise 100 or more alternating layers of diverse polymers, and may contain up to several hundred layers.

The films of the present invention also have improved transparency to light. This minimizes absorption and dispersion of that portion of incident light not reflected. Further, the films have sufficient elasticity to permit a wide variation in reflected wavelengths as the films are stretched. The films also rapidly relax and recover to their original thicknesses when stretching forces are removed.

The films also have compatible rheological properties for coextrusion. That is, as a preferred method of forming the multilayer films is the use of coextrusion techniques, the melt viscosities of the elastomers must be reasonably matched to prevent layer instability or nonuniformity. The elastomers used also have sufficient interfacial adhesion so that the films will not delaminate.

The elastomeric polymers used in the practice of the present invention have the properties of substantial transparency, elasticity, mismatch of refractive index, and processability to provide improved optical interference films. Suitable polyurethane elastomers include polytetramethylene glycol ether thermoplastic polyurethanes and polyadipate ester thermoplastic polyurethanes. Such thermoplastic polyurethanes are commercially available. A polymer pair which has been found to be effective in the practice of the present invention are Pellethane (Trademark of Dow Chemical Company) 2103-70A and Pellethane 2363-65D. Both are polytetramethylene glycol ether thermoplastic polyurethanes. The former has a refractive index of 1.51 while the latter has a refractive index of 1.57. Both have good transparency at typical film thicknesses used in the present invention. The refractive indices of the compositions may be modified by varying the ratio of hard (isocyanate) to soft (polyol) segments.

Other elastomers may be used in combination with either of the above described polyurethanes. For example, polyether block amides available commercially from Atochem, Inc. under the trademark Pebax and flexible copolyesters available from Eastman Chemical Products, Inc. under the trademark Ecdel both possess the transparency, refractive index, rheological properties, and elasticity needed to function effectively in the present invention.

The Pebax elastomeric polyether block amides consist of linear chains of rigid polyamide segments and flexible polyether segments represented by the formula:

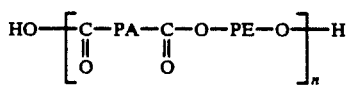

Suitable grades of the Pebax polyether block amides include the 4033, 3533, and 2533 series. The refractive indices of the series of compounds are 1.49, 1.48, and 1.49, respectively. The Ecdel PCCE copolyester has a refractive index of 1.52.

A number of different combinations of these elastomers is suitable for use in the practice of the present invention. For example, multilayer films utilizing Pebax 2533 (refractive index 1.49) and Pellethane 2355-95AEF (a polyadipate ester thermoplastic polyurethane having a refractive index of 1.55) are a preferred combination. Such films have a refractive index mismatch of 0.06 and exhibit rapid recovery after stretching. Other suitable combinations include Pellethane 2103-70A and Pellethane 2363-75D with a refractive index mismatch of 0.07, Ecdel PCCE copolyester and Pellethane 2363-65D with a refractive index mismatch of 0.05, Ecdel PCCE and Pellethane 2363-75D with a refractive index mismatch of 0.06, and Pebax 2533 and Pellethane 2363-75D with a refractive index mismatch of 0.09.

The elastomeric optical interference film of the present invention may also optionally include a skin layer on one of or both major surfaces of the film. The skin layer comprises a blend of a substantially transparent elastomeric polymeric material with a substantially transparent, nonelastomeric polymeric material having substantially the same index of refraction as the elastomeric polymer. Optionally, the elastomeric polymeric material in the skin layer may be one of the elastomers which makes up the alternating layers of the optical interference film. The selection of polymers having substantially the same refractive index for the skin layer preserves the transparency and clarity of the optical interference film. By "substantially the same refractive index", it is preferred that the respective refractive indices of the polymers differs by 0.03 or less. Use of polymers in the skin layer which have greater refractive index mismatches may result in an undesirable hazy appearance and/or an increase in opacity.

The skin layer or layers may serve as a sacrificial protective layer which is coextruded with the thin elastomeric layers to protect them from breaking up due to shear forces encountered during fabrication. In that instance, the protective layer need not be of an elastomeric material as it is peeled from the elastomeric optical interference film once fabrication is complete. However, it has been found that the elastomeric film produced retains some degree of tackiness and may block to itself when rolled. To prevent blocking, and yet maintain the optical characteristics of the film, it has been found that the skin layers which are coextruded on the exterior surfaces of the film may be formed of a blend of (a) a substantially transparent elastomeric polymeric material with (b) a nonelastomeric polymer having substantially the same refractive index. As previously described, the elastomer component may optionally be one of the elastomers which makes up the alternating layers of the film.

By "blend", it is meant a physical mixture of the two polymers which remain as discrete components. Preferably, the nonelastomeric polymer is present in the blend in only a minor amount of between about 0.05 to about 10%, and preferably about 4.0% to about 6.0%, by weight. In such amounts, the nonelastomeric polymer is present in the blend as a series of discontinuous islands surrounded by the continuous phase of elastomer. In this manner, the skin layer maintains its elastomeric character because the elastomeric component of the blend remains free to stretch. Yet, the tackiness of the film is reduced by the presence in the skin layer of the nontacky, nonelastomeric component of the blend. This permits the film to be wound after fabrication without blocking to itself, and also permits the skin layer to be retained permanently with the film.

In a preferred embodiment, the nonelastomeric polymer is a polypropylene resin such as Profax 6131, available from Hercules. This resin has a refractive index of 1.49. Thus, a preferred composition for the skin layer of the present invention is a blend of 5% by weight Profax 6131 polypropylene and 95% by weight of Pebax 2533 polyether block amide (1.49 refractive index). Such a permanent, transparent skin layer is advantageous in that no post-fabrication treatment of the optical interference film is required such as the application of release agents or the like to the film surface. Such application may result in impaired ink adhesion if the film is to be printed and poor adhesion if the film is attempted to be laminated.

The transparent elastomeric optical interference films of the present invention have a number of uses. For example, the films may be used for packaging which display changing color patterns. The wrapping of irregular shaped items will cause the films to stretch in a variety of ways and exhibit unique color patterns. Toy or novelty items which change colors when stretched, such as balloons or embossed patterns are also possible. Pulsating signs or advertisements may be fabricated in which selective stretching of portions of the film by an inflation/deflation mechanism causes a pulsating color change effect.

The optical interference films of the present invention may also find use as solar screens which reflect infrared light. By coextruding such films with an individual layer thickness gradient, the film can be made to reflect a broad band width of light. Because of the elasticity of the films, the infrared reflecting characteristics of the film may be changed by stretching the films. Thus, depending upon the desired characteristics, the film can be made to reflect infrared during certain times of the day, and then be stretched to appear transparent to visible light. Even when stretched, the film will continue to reflect ultraviolet wavelengths.

The elastomeric films of the present invention may also be used as adjustable light filters in photography by stretching the film to cause it to reflect different wavelengths of light. The films of the present invention may also find use in agriculture. As it is known that plant growth is influenced by the wavelength of light received by the plant, a greenhouse film may be formed that varies the transmitted wavelengths of light desired. Further if transmission of a specific wavelength of light is desired as the angle of incidence of sunlight changes during the day, the film may be adjusted by stretching or relaxing it to maintain a constant transmitted wavelength.

The films of the present invention may also be used as pressure sensors to detect pressure changes and exhibit a color change in response thereto. For example, the film of the present invention may be fabricated into a diaphragm or affixed to another rubbery surface such as that of a tire to act as a pressure or inflation sensor. Thus, an elastomeric film sensor may be provided which reflects red when an under-inflated condition is encountered, green when there is a correct pressure, and blue when there exists an over-inflated condition.

Elastomeric films of the present invention may also find use as strain gauges or stress coatings. A film of the present invention may be laminated to the surface of a structure, and then exposed to a load. Deformation of the surface may then be measured precisely using a spectrophotometer which measures the change in wavelength of light reflected from the film. Extremely large surface areas may be covered with the film of the present invention.

The elastomeric films may also find use in erasable optical disc technology. For example, laser imprinting of information onto optical discs causes local deformations to appear on the surface of the discs. These local deformations reflect different wavelengths of light which may be read by a second laser. Thus, an optical disc coated with the elastomeric film of the present invention can be used to store, and then erase, information when the film is permitted to relax to its original state. The film can then be imprinted with new information.

Multilayer elastomeric films in accordance with the present invention are most advantageously prepared by employing a multilayered coextrusion device as described in U.S. Pat. Nos. 3,773,882 and 3,884,606, the disclosures of which are incorporated herein by reference. Such a device provides a method for preparing multilayered, simultaneously extruded thermoplastic materials, each of which are of a substantially uniform layer thickness. Preferably, a series of layer multiplying means as are described in U.S. Pat. No. 3,759,647, the disclosure of which is incorporated herein by reference, is employed.

The feed block of the coextrusion device receives streams of the diverse thermoplastic polymeric materials from a source such as a heat plastifying extruder. The streams of resinous materials are passed to a mechanical manipulating section within the feedblock. This section serves to rearrange the original streams into a multilayered stream having the number of layers desired in the final film. Optionally, this multilayered stream may be subsequently passed through a series of layer multiplying means in order to increase further the number of layers in the final film.

The multilayered stream is then passed into an extrusion die which is so constructed and arranged that streamlined flow is maintained therein. Such an extrusion device is described in U.S. Pat. No. 3,557,265, the disclosure of which is incorporated by reference herein. The resultant product is extruded to form a multilayered film in which each layer is generally parallel to the major surface of adjacent layers.

The configuration of the extrusion die can vary and can be such as to reduce the thickness and dimensions of each of the layers. The precise degree of reduction in thickness of the layers delivered from the mechanical orienting section, the configuration of the die, and the amount of mechanical working of the film after extrusion are all factors which affect the thickness of the individual layers in the final film.

In order that the invention may be more readily understood, reference is made to the following examples, which are intended to illustrate the invention, but are not to be taken as limiting the scope thereof.

EXAMPLE 1

Employing an apparatus as generally described in U.S. Pat. Nos. 3,773,882 and 3,759,647, a multilayer elastomeric film was made by coextruding Pellethane 2103-70A and Pellethane 2363-65D, both available from the Dow Chemical Company, into a 769 layer film having repeating units ABABAB. Extruders were used to feed the two elastomers to the feedblock at rates to give equal average weights of the two elastomers to the composition. Chill roll speed which took away the film was varied to draw films having about 38 to 100 micrometers in total thickness. Average individual layer thicknesses varied from about 0.056 to 0.13 micrometers.

The unstretched thinner films were measured to reflect in the ultraviolet region, while the unstretched thicker films reflected in the infrared region. Spectral shift at various degrees of stretch was measured with a spectrophotometer. A fixture was used to stretch a 1" (25 mm) wide strip of the multilayer film from zero to 100% apparent elongation based on a 1½" (38 mm) gage length. Each fixture clamp could be adjusted equally so that the light beam was directed at the same portion of the film as the strip was elongated. Transmission spectra were obtained at 0, 25, 50, 75, and 100% apparent elongation. Reflectance spectra were calculated assuming negligible absorption.

FIG. 1 shows the spectral shift to lower wavelengths in the range of 500 to 800 nm with the various degrees of stretch. Full curves are shown for zero and 25% elongation; for clarity, only the highlighted characteristic peaks are shown for 50, 75, and 100% elongation. Spectra are similar in shape as the film reflects shorter wavelengths with increased amounts of stretch. The broad bandwidths are a result of a layer thickness gradient through the film thickness.

Figure 2:
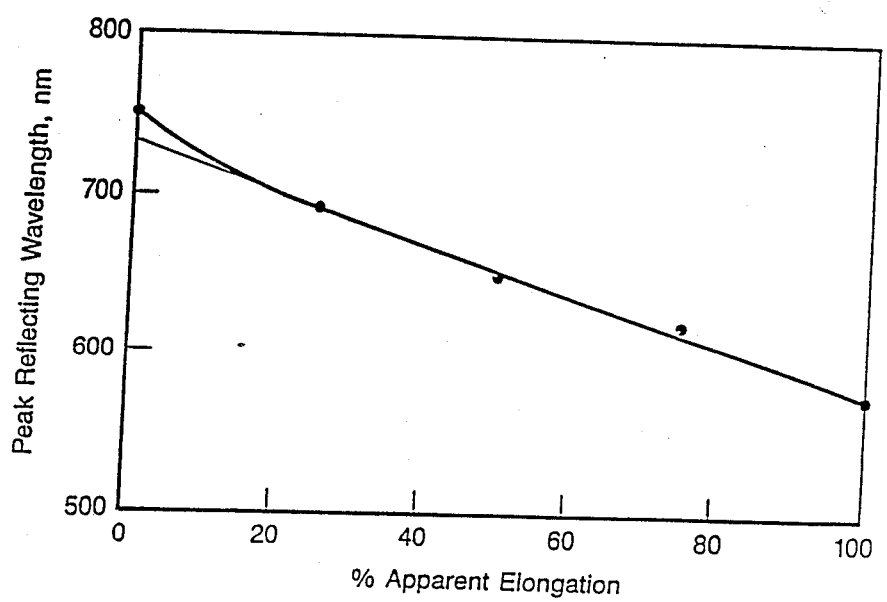
FIG. 2 is a graph of peak reflecting wavelength versus apparent elongation for a multilayer film of the present invention.

A peak reflecting wavelength of 750 nm was chosen from the reflection spectrum at 0% stretch because its characteristic shape made it easy to identify. The new position of this peak was then recognized on spectra determined at various degrees of stretch: 750 nm @ 0%, 690 nm @ 25%, 645 nm @ 50%, 610 nm @ 75%, and 580 nm @ 100%. FIG. 2 shows how these characteristic peak wavelengths decrease linearly with apparent elongation from 25% to 100% elongation. The nonlinear response at low elongation is caused by necking as a result of high initial Poisson's ratio.

Figure 3:
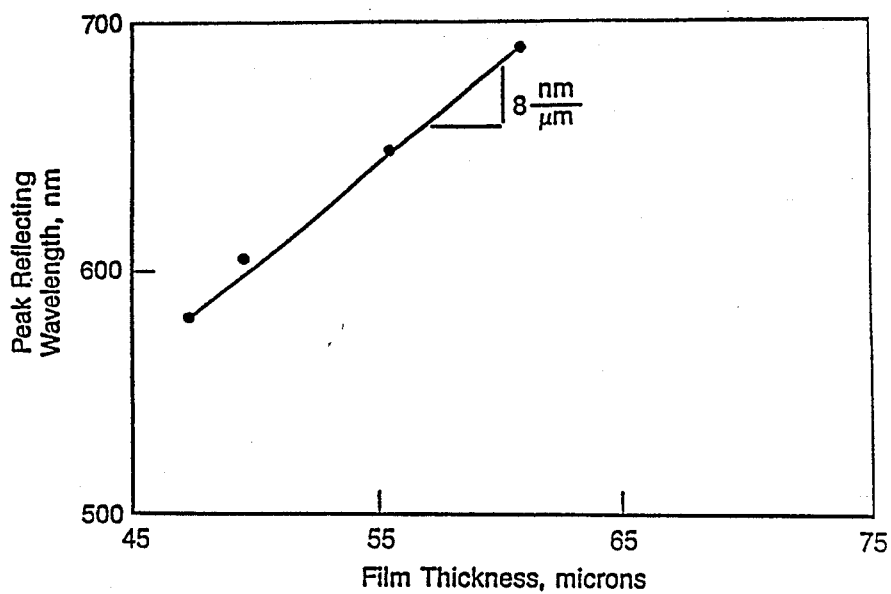
FIG. 3 is a graph of the linearity of the change in peak reflecting wavelength versus film thickness for a multilayer film of the present invention.

FIG. 3 shows the expected linear dependence of peak reflecting wavelength with film thickness. The slope of 8 nm wavelength per micron change in film thickness is in excellent agreement with the calculated theoretical value.

In order to describe the mechanical behavior of the multilayered elastomeric film, tests were conducted to determine tensile strength, hysteresis loss, and rate of recovery. Microlayer elastomeric samples of dimensions 1"×1.5"×0.003" (25 mm×38 mm×76 micron) were stretched in an Instron tensile tester from 0% to 100% elongation and then allowed to relax. Crosshead speed was 3"/min (76 mm/min) during both extension and relaxation of the samples. The greatest energy loss was observed in the first cycle where initial molecular alignment occurred, and decreased with repeated cycling.

Figure 4:
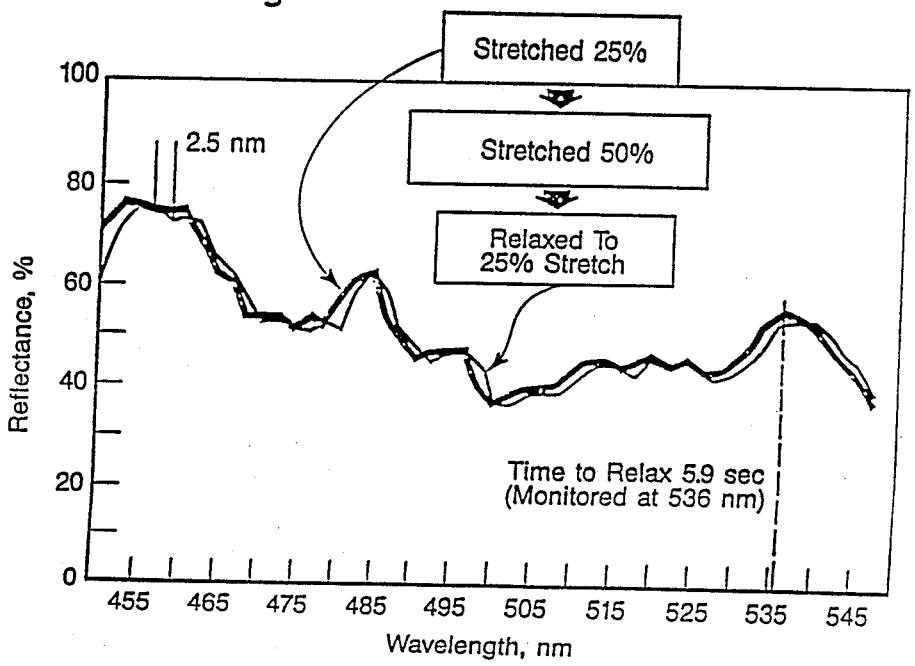
FIG. 4 is a graph of reflectance versus wavelength illustrating the spectral recovery of a stretched multilayer film of the present invention.
Figure 5:
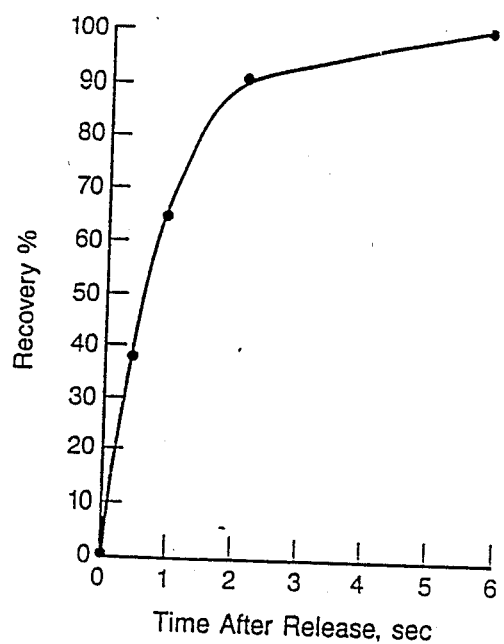
FIG. 5 is a graph of rate of recovery of a multilayer film of the present invention after stretching versus time.

Spectral recovery, i.e., ability of the film to return to the original reflection spectrum after deformation and relaxation, was determined on a strip of film which had been repeatedly stretched and relaxed. The specimen was stretched to 25% apparent elongation and the reflection spectrum measured. It was then stretched to 50% and quickly released to allow relaxation to the original 25% elongation where the spectrum was remeasured. FIG. 4 shows good reproducibility. Time to recover was determined by monitoring reflectivity at 536 nm as the sample recovered. 90% recovery occurred within 2 seconds, with full recovery occurring within 5.9 seconds after release (see FIG. 5).

EXAMPLE 2

The film of Example 1 was coextruded with sacrificial skin layers of polypropylene (Profax 6131 available from Hercules) to prevent flow instabilities during coextrusion and blocking of the film when wound into a roll. These skin layers were peeled from the film in a separate step after coextrusion of the film. Films made exhibited reflection at infrared wavelengths when unstretched. Stretching caused the films to reflect visible light. Further stretching resulted in films in which the layer thicknesses were reduced so that the films became transparent to visible light, reflecting only in the ultraviolet region.

EXAMPLE 3

Employing an apparatus as generally described in U.S. Pat. Nos. 3,773,882 and 3,759,647, a multilayer elastomeric film was made by coextruding Pellethane 2355-95AEF, available from the Dow Chemical Company, and Pebax 2533, available from Atochem, Inc., into a 197 layer film having repeating units ABABAB. Permanent protective elastomeric skin layers were coextruded with the film and comprised a blend of 95% by weight Pebax 2533 (refractive index 1.49) and 5% by weight Profax 6131 polypropylene resin (refractive index 1.49, available from Hercules). The skin layers prevented flow instabilities during coextrusion and blocking of the film when wound in a roll. The skin layers did not restrict the stretching of the film, and remained haze free due to the match of refractive indices of the components of the blend.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. An elastomeric optical interference film comprising at least 100 alternating layers of at least first and second divergent substantially transparent elastomeric polymeric materials, wherein said first and second polymeric materials are selected from the group consisting of polytetramethylene glycol ether thermoplastic polyurethanes, polyadipate ester thermoplastic polyurethanes, polyether block amides, and flexible copolyesters, and wherein adjacent layers of said first and second polymeric materials differ from each other in refractive index by at least about 0.05 and the thickness of said layers is from about 0.05 to about 0.5 micrometers.

2. The elastomeric optical interference film of claim 1 in which the layers of said first and second polymeric materials vary in thickness.

3. The elastomeric optical interference film of claim 1 in which the layers of either or both of said first and second polymeric material are arranged in a generally increasing thickness.

4. The elastomeric optical interference film of claim 1 in which both of said first and second polymeric materials are polytetramethylene glycol ether thermoplastic polyurethanes.

5. The elastomeric optical interference film of claim 1 in which said first polymeric material is a polyadipate ester thermoplastic polyurethane and said second polymeric material is a polyether block amide.

6. The elastomeric optical interference film of claim 1 in which said first polymeric material is a polytetramethylene glycol ether thermoplastic polyurethane and said second polymeric material is a polyether block amide.

7. The elastomeric optical interference film of claim 1 in which said first polymeric material is a polytetramethylene glycol ether thermoplastic polyurethane and said second polymeric material is a copolyester.

8. The elastomeric optical interference film of claim 1 in which said film reflects visible wavelengths of light.

9. The elastomeric optical interference film of claim 1 in which said first and second polymeric materials differ from each other in refractive index by at least about 0.06.

10. The elastomeric optical interference film of claim 1 in which the layers of said film are varied in thickness by stretching, whereby said film reflects different wavelengths of light as said thickness is varied.

11. The elastomeric optical interference film of claim 10 in which said layers recover substantially their original thickness in the absence of stretching forces.

12. The elastomeric optical interference film of claim 1 in which said film reflects infrared wavelengths when in an unstretched condition.

13. The elastomeric optical interference film of claim 12 in which said film reflects ultraviolet wavelengths when in a stretched condition.

14. The elastomeric optical interference film of claim 1 including at least one skin layer on an exterior surface of said film, said skin layer comprising a blend of (a) a substantially transparent elastomeric polymeric material and (b) a substantially transparent, nonelastomeric polymeric material having substantially the same index of refraction as said elastomeric polymeric material in said blend.

15. The elastomeric optical interference film of claim 14 including skin layers on both exterior surfaces of said film.

16. The elastomeric optical interference film of claim 14 in which said elastomeric polymeric material in said skin layer is one of said first and second elastomeric polymeric materials in said alternating layers in said film.

17. The elastomeric optical interference film of claim 14 in which said nonelastomeric polymeric material is present in said blend in an amount between about 0.5 to about 10% by weight.

18. The elastomeric optical interference film of claim 14 in which said nonelastomeric polymeric material is polypropylene.

19. The elastomeric optical interference film of claim 14 in which said skin layer comprises a blend of a polyether block amide elastomer and polypropylene.

20. The elastomeric optical interference film of claim 19 in which said skin layer comprises 95% by weight of said polyether block amide elastomer and 5% by weight of said polypropylene.

21. An elastomeric optical interference film comprising at least 100 alternating layers of at least first and second divergent substantially transparent elastomeric polymeric materials, wherein said first and second polymeric materials are selected from the group consisting of polytetramethylene glycol ether thermoplastic polyurethanes, polyadipate ester thermoplastic polyurethanes, polyether block amides, and flexible copolyesters, and wherein adjacent layers of said first and second polymeric materials differ from each other in refractive index by at least about 0.05 and the thickness of said layers is from about 0.05 to about 0.5 micrometers, said film including at least one skin layer on an exterior surface of said film, said skin layer comprising a blend of (a) a substantially transparent, elastomeric polymeric material and (b) a substantially transparent, nonelastomeric polymeric material having substantially the same index of refraction as said elastomeric polymeric material in said blend.

22. The elastomeric optical interference film of claim 21 in which said elastomeric polymeric material in said skin layer is one of said first and second elastomeric polymeric materials in said alternating layers in said film.

23. The elastomeric optical interference film of claim 21 in which said skin layer comprises a blend of 95% by weight of a polyether block amide elastomer and 5% by weight of polypropylene.

* * * * *